(12) United States Patent
Ye

(10) Patent No.: US 9,583,926 B2
(45) Date of Patent: Feb. 28, 2017

(54) HANGER BAR

(71) Applicant: Thomas & Betts International LLC, Wilmington, DE (US)

(72) Inventor: Zachary Ye, Shanghai (CN)

(73) Assignee: Thomas & Betts International LLC, Wilmington, DE (US)

( * ) Notice: Subject to any disclaimer, the term of this patent is extended or adjusted under 35 U.S.C. 154(b) by 0 days.

(21) Appl. No.: 14/256,087

(22) Filed: Apr. 18, 2014

(65) Prior Publication Data
US 2014/0353442 A1 Dec. 4, 2014

Related U.S. Application Data

(60) Provisional application No. 61/830,736, filed on Jun. 4, 2013.

(51) Int. Cl.
H02G 3/12 (2006.01)
E04B 9/00 (2006.01)
E04C 3/02 (2006.01)

(52) U.S. Cl.
CPC ............ H02G 3/125 (2013.01); E04B 9/006 (2013.01); E04C 2003/026 (2013.01)

(58) Field of Classification Search
CPC .......... H02G 3/125; H02G 3/20; H02G 3/126; H02G 3/12; H02G 15/06; F16M 13/027; F16M 13/02; E04B 9/006; E04C 2003/026; Y10S 248/906
USPC ......... 248/200.1, 201, 200, 906, 340, 205.1, 248/343, 342; 174/40 R, 58, 63, 54
See application file for complete search history.

(56) References Cited

U.S. PATENT DOCUMENTS

| 805,570 | A | * | 11/1905 | Maldaner | 248/264 |
| 1,554,212 | A | * | 9/1925 | Henry | 248/262 |
| 1,718,878 | A | * | 6/1929 | Raquette | 220/3.4 |
| 2,336,414 | A | * | 12/1943 | Mitchell | 362/260 |
| 2,713,983 | A | | 7/1955 | Kay | |
| 2,809,002 | A | | 10/1957 | Rudolph | |
| 2,917,263 | A | | 12/1959 | Appleton et al. | |
| 2,945,661 | A | | 7/1960 | Appleton | |
| 2,963,253 | A | | 12/1960 | Maier et al. | |
| 3,163,386 | A | | 12/1964 | Stephenson | |
| 3,285,553 | A | | 11/1966 | Hexdall | |
| 3,425,655 | A | * | 2/1969 | Cogdill | 248/343 |
| 3,518,421 | A | | 6/1970 | Cogdill | |
| 3,891,091 | A | * | 6/1975 | Anderson | 211/105.3 |
| 4,165,851 | A | | 8/1979 | Bowden, Jr. et al. | |
| 4,513,994 | A | | 4/1985 | Dover et al. | |
| 4,909,405 | A | | 3/1990 | Kerr, Jr. | |
| 5,044,582 | A | * | 9/1991 | Walters | H02G 3/126 248/200.1 |

(Continued)

FOREIGN PATENT DOCUMENTS

| CA | 2062844 | 6/1995 |
| CA | 2254236 | 5/1999 |

(Continued)

Primary Examiner — Nkeisha Smith
(74) Attorney, Agent, or Firm — Hoffman & Baron, LLP

(57) ABSTRACT

A hanger bar is provided for suspending and securing an electrical box between ceiling joists. The hanger bar is comprised of a main tube section, a box support bracket, a box which attaches to the box support bracket and two end plates which are attached to the main tube section without the use of fasteners or welding.

20 Claims, 6 Drawing Sheets

(56) References Cited

U.S. PATENT DOCUMENTS

| | | |
|---|---|---|
| 5,114,105 A | 5/1992 | Young |
| 5,303,894 A | 4/1994 | Deschamps et al. |
| 5,330,137 A | 7/1994 | Oliva |
| 5,386,959 A | 2/1995 | Laughlin et al. |
| 5,505,419 A | 4/1996 | Gabrius |
| 5,678,799 A | 10/1997 | Jorgensen et al. |
| 5,934,631 A | 8/1999 | Becker et al. |
| 5,938,157 A | 8/1999 | Reiker |
| 5,954,304 A | 9/1999 | Jorgensen |
| 5,957,573 A * | 9/1999 | Wedekind et al. ............ 362/365 |
| 6,491,270 B1 * | 12/2002 | Pfaller ....................... 248/200.1 |
| 6,519,791 B2 | 2/2003 | Randolph |
| 6,666,419 B1 | 12/2003 | Vrame |
| 6,889,943 B2 * | 5/2005 | Dinh et al. ..................... 248/343 |
| 6,967,284 B1 | 11/2005 | Gretz |
| 7,036,782 B2 | 5/2006 | Cheatham et al. |
| 7,040,586 B2 | 5/2006 | Kusber et al. |
| 7,216,838 B1 | 5/2007 | Gretz |
| 7,355,118 B1 | 4/2008 | Gretz |
| 7,654,495 B2 | 2/2010 | Adrian et al. |
| 7,810,775 B2 * | 10/2010 | Dal Ponte et al. ............ 248/343 |
| 7,857,275 B2 * | 12/2010 | de la Borbolla .............. 248/342 |
| 8,038,113 B2 * | 10/2011 | Fryzek et al. ................. 248/343 |
| 8,091,721 B1 * | 1/2012 | Gretz ............................ 220/3.9 |
| 8,177,176 B2 * | 5/2012 | Nguyen et al. ............. 248/200.1 |
| 8,272,615 B2 * | 9/2012 | Silcox et al. .................. 248/342 |
| 8,889,984 B2 * | 11/2014 | Korcz et al. .................. 174/40 R |
| 2003/0006353 A1 * | 1/2003 | Dinh et al. .................... 248/343 |
| 2010/0270446 A1 | 10/2010 | Phillips |
| 2014/0238717 A1 * | 8/2014 | Korcz et al. .................... 174/50 |

FOREIGN PATENT DOCUMENTS

| | | |
|---|---|---|
| CA | 2270496 | 12/2003 |
| CA | 2390970 | 8/2007 |

* cited by examiner

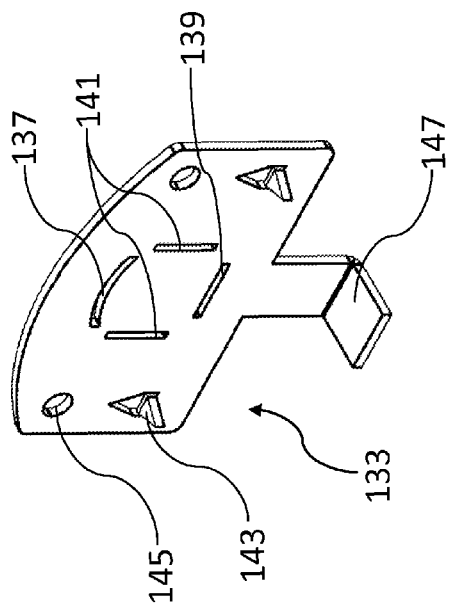
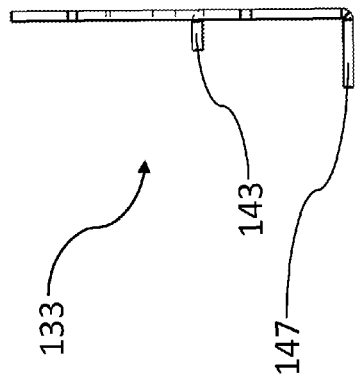
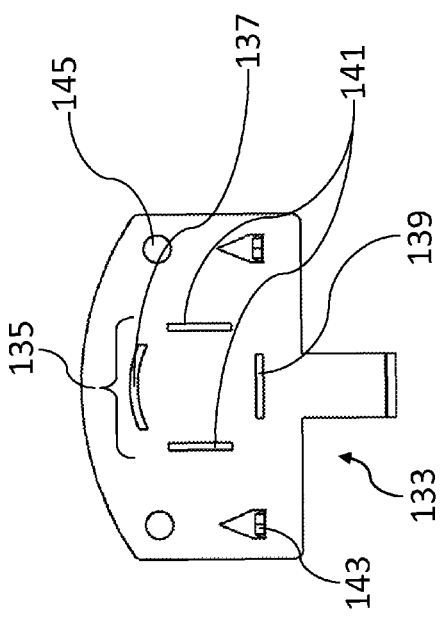
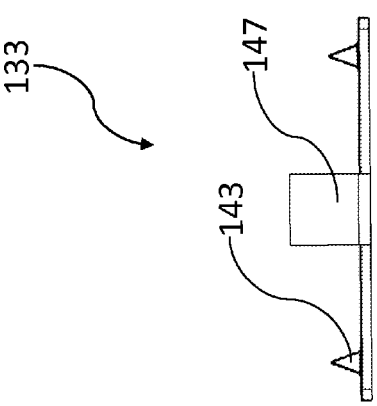

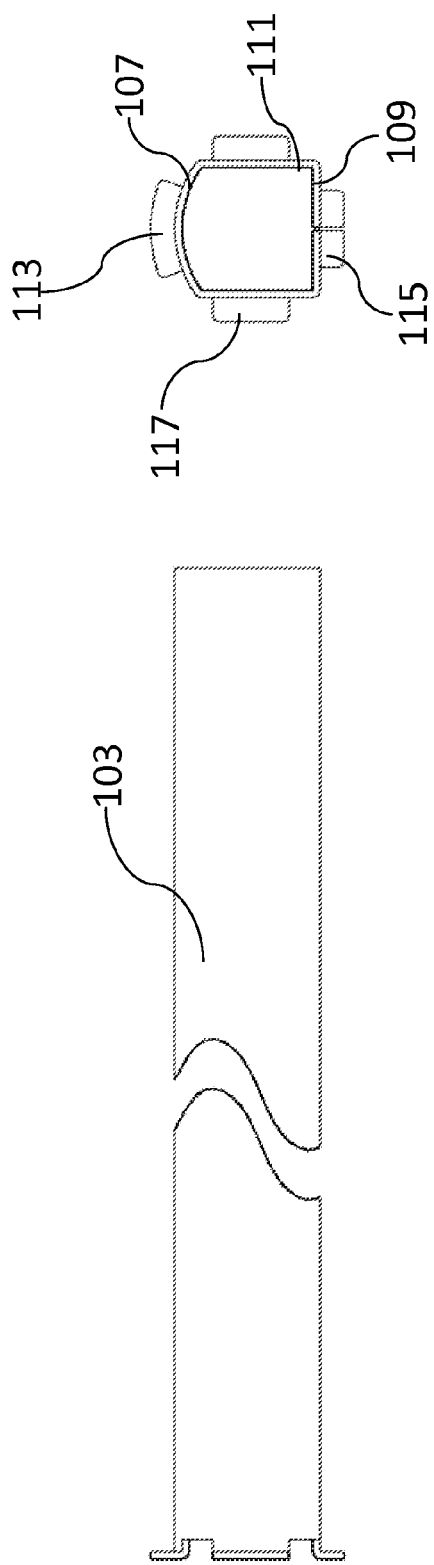
FIG. 7
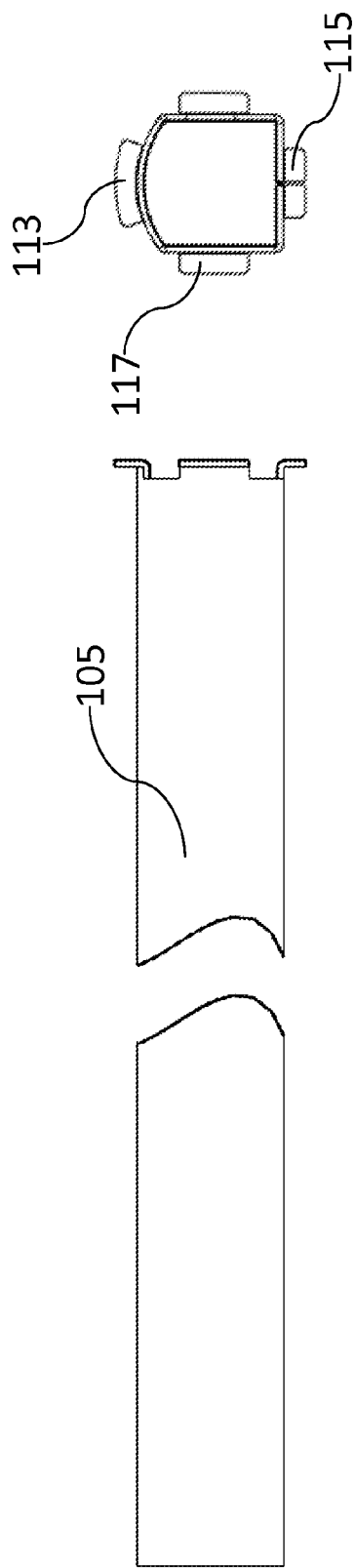
FIG. 9
FIG. 8
FIG. 10

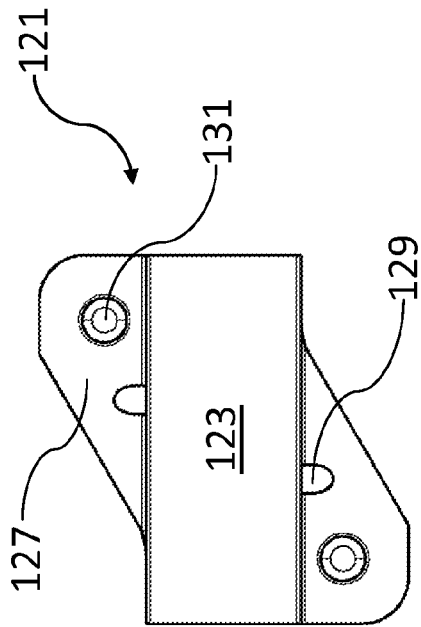
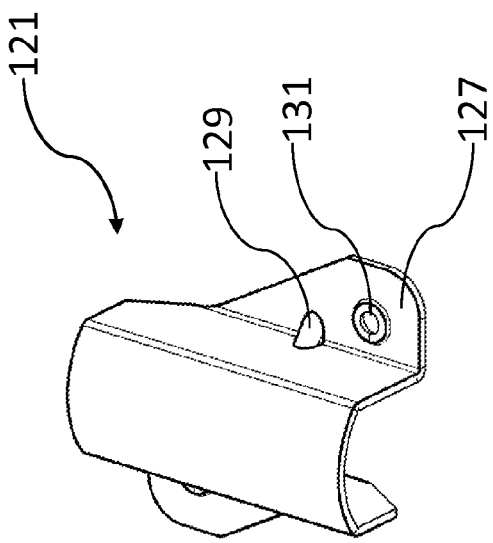
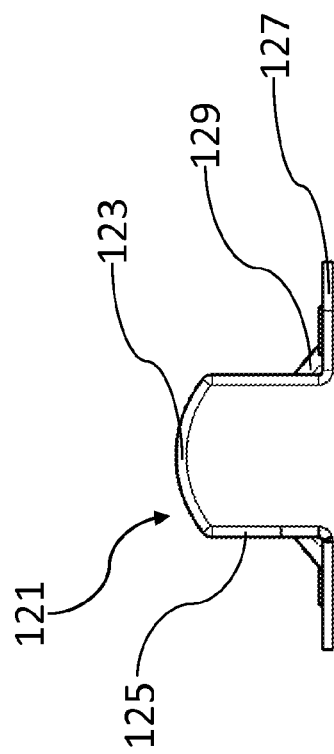

HANGER BAR

FIELD OF THE INVENTION

In general, the present invention relates to an improved hanger bar which is used to suspend an electrical box between two joists in a ceiling.

BACKGROUND

Hanger bars have been used for many years when securing electrical boxes between ceiling joists. Most hanger bars have square cross sections and are composed of two main tube sections which slide within one another so that the hanger bar can be expanded. Hanger bars have plates at their ends which are welded or screwed to the main tube sections of the hanger bars, and these end plates usually have prongs for piercing the wood of ceiling joists which the hanger bar is installed on to temporarily keep the bar in place while an installer prepares to permanently install the bar onto the ceiling joists with screws or nails. The current method by which hanger bar end plates attach to hanger bars, through welding or using screws, results in expensive manufacturing costs.

SUMMARY OF THE INVENTION

The present invention provides a hanger bar comprised of two main tube sections which fit together to allow the bar to telescopically expand to allow for variable distances between ceiling joists, a box support bracket and box for attaching to an electrical device such as a light fixture or ceiling fan, and end plates which do not require any tools or extra parts for attachment onto the hanger bar and that allow the hanger bar to attach to the ceiling joists.

BRIEF DESCRIPTION OF THE DRAWINGS

FIG. 3 is a front elevation view of an end plate of a hanger bar of the present invention.

FIG. 4 is a front perspective view of an end plate of a hanger bar of the present invention.

FIG. 5 is a bottom plan view of an end plate of a hanger bar of the present invention.

FIG. 6 is a side elevation view of an end plate of a hanger bar of the present invention.

FIG. 7 is a side elevation view of a left-hand side tube segment of a hanger bar of the present invention.

FIG. 8 is a front elevation view of a distal end of a left-hand side tube segment of a hanger bar of the present invention.

FIG. 9 is a side elevation view of a right-hand side tube segment of a hanger bar of the present invention.

FIG. 10 is a front elevation view of a distal end of a right-hand side tube segment of a hanger bar of the present invention.

FIG. 11 is a front perspective view of a box support bracket of a hanger bar of the present invention.

FIG. 12 is a top plan view of a box support bracket of a hanger bar of the present invention.

FIG. 13 is a front elevation view of a box support bracket of a hanger bar of the present invention.

DETAILED DESCRIPTION OF THE PREFERRED EMBODIMENT(S)

Figure 1:
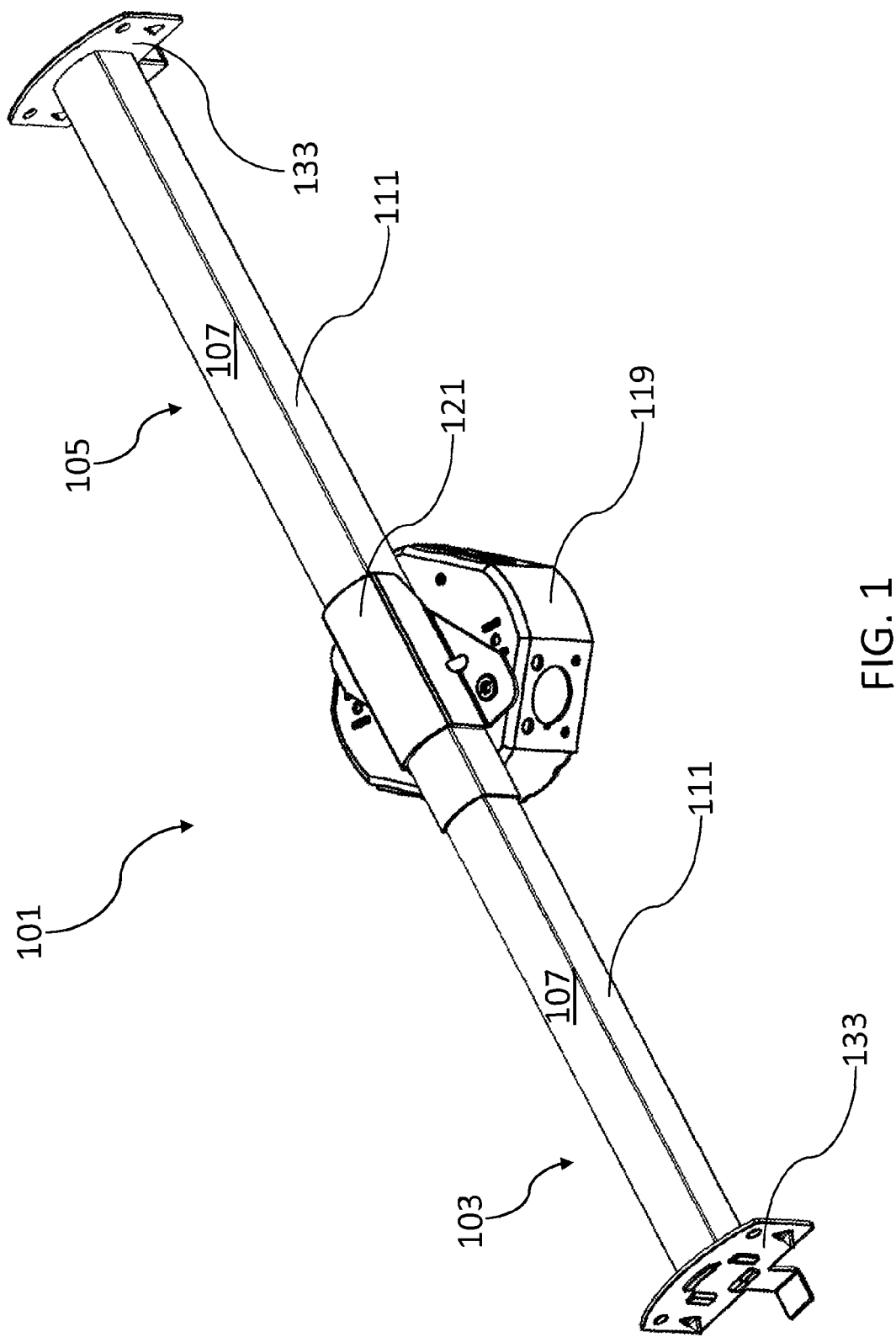
FIG. 1 is a front perspective view of a hanger bar of the present invention.

The above and other features, aspects and advantages of the present invention will now be discussed in the following detailed description of preferred embodiments and appended claims, which are to be considered in conjunction with the accompanying drawings in which identical reference characters designate like elements throughout the views.

Figure 2:
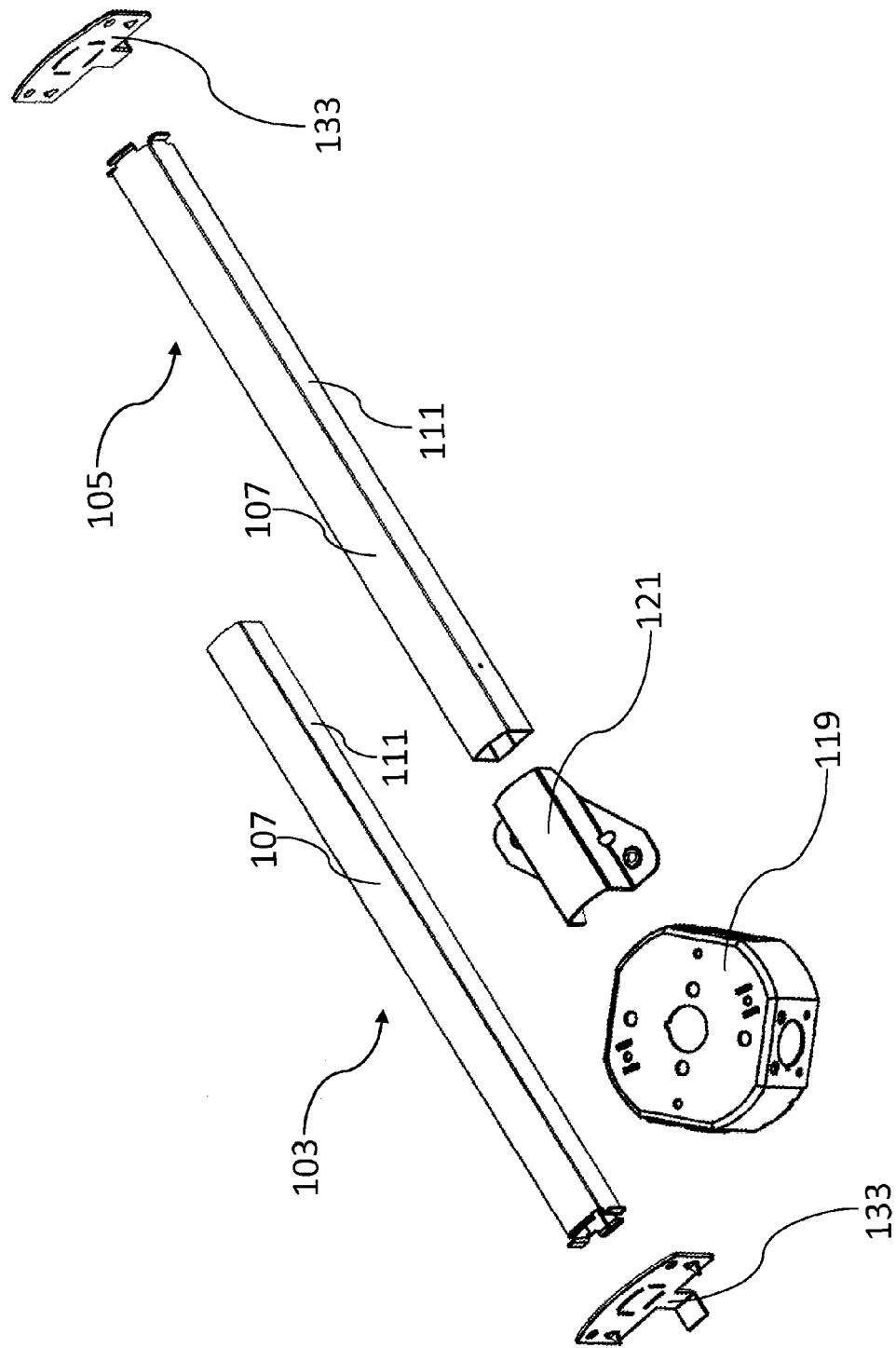
FIG. 2 is an exploded front perspective view of a hanger bar of the present invention.

Shown in FIG. 1 is a front perspective view of a hanger bar 101 of the present invention. The hanger bar 101 comprises the following parts: a first tube segment 103, a second tube segment 105, end plates 133 located at distal ends of the tube segments 103 and 105, a box support bracket 121 and a box 119. FIG. 2 shows the same hanger bar 101 and components as shown in FIG. 1, but FIG. 2 shows the entire assembly in an exploded view for ease of viewing the separate components.

Shown in FIGS. 3-6 are differing views of the end plates 133 which are shown at distal ends of the tube segments 103 and 105 in FIG. 1. FIG. 3 and FIG. 4 show that the end plates 133 contain four slots 135. A top slot 137, a bottom slot 139 and two side slots 141 comprise the four slots 135. Turning to FIG. 8 and FIG. 10, there are shown front elevation views of distal ends of the tube segments 103 and 105. From FIG. 8 and FIG. 10, it can be seen that a plurality of tabs protrude from the edges of the distal ends of tube segments 103 and 105. When looking at FIG. 3 and FIG. 8 or FIG. 3 and FIG. 10 simultaneously, it can be seen that the four end plate slots 135 shown in FIG. 3 align with the tabs 113, 117 and 115 shown in FIGS. 8 and 10. The top slot 137 shown in FIG. 3 is sized to fit the top tab 113 shown in FIGS. 8 and 10, the bottom slot 139 shown in FIG. 3 is sized to fit the bottom tab 115 shown in FIGS. 8 and 10, and the side slots 141 are sized to fit the side tabs 117 shown in FIGS. 8 and 10. FIG. 1 shows how the end plates 133 fit on the tabs located at distal ends of the tube segments 103 and 105. Although FIGS. 3 and 4 show the end plate 133 with four slots 135 and FIGS. 8 and 10 show the distal ends of the tube segments 103 and 105 having four tabs, it is understood that any number of slots may be used for the end plates 133 and any number of tabs may be used on the distal ends of the tube segments 103 and 105, so long as the tabs and slots align with one another so the slots can receive the tabs.

The tabs are received by the slots to attach the end plates 133 to the tube segments 103 and 105 during manufacturing. FIGS. 8 and 10 show the tabs 113, 115 and 117 as being perpendicular to the respective walls 107, 109 and 111 of the tube segments 103 and 105 to which they are attached. This perpendicular position of the tabs to the walls of the tube segments 103 and 105 is the position that the tabs are in after installation of the end plates 133 on the tube segments 103 and 105, as shown in FIG. 1. However, prior to the end plates 133 being installed on the tube segments 103 and 105 during manufacturing, the tabs are parallel along the same plane of the respective walls that they are attached to so that they can be inserted through the respective slots in the end plates 133. The tabs are then bent into the position as shown in FIG. 1 during manufacturing once the end plates have been installed on the tube segments. This ensures that the end plates are securely attached and will not come loose, but does not require extra fasteners like screws or any welding. Using the tabs and slots to attach the end plates 133 to the tube segments 103 and 105 results in reduced manufacturing costs of the hanger bar 101 when compared to current construction of hanger bars, as costly welding is not required for attachment of the end plates 133 and neither are extra parts, such as screws, needed for attachment of the end plates 133.

Figure 14:
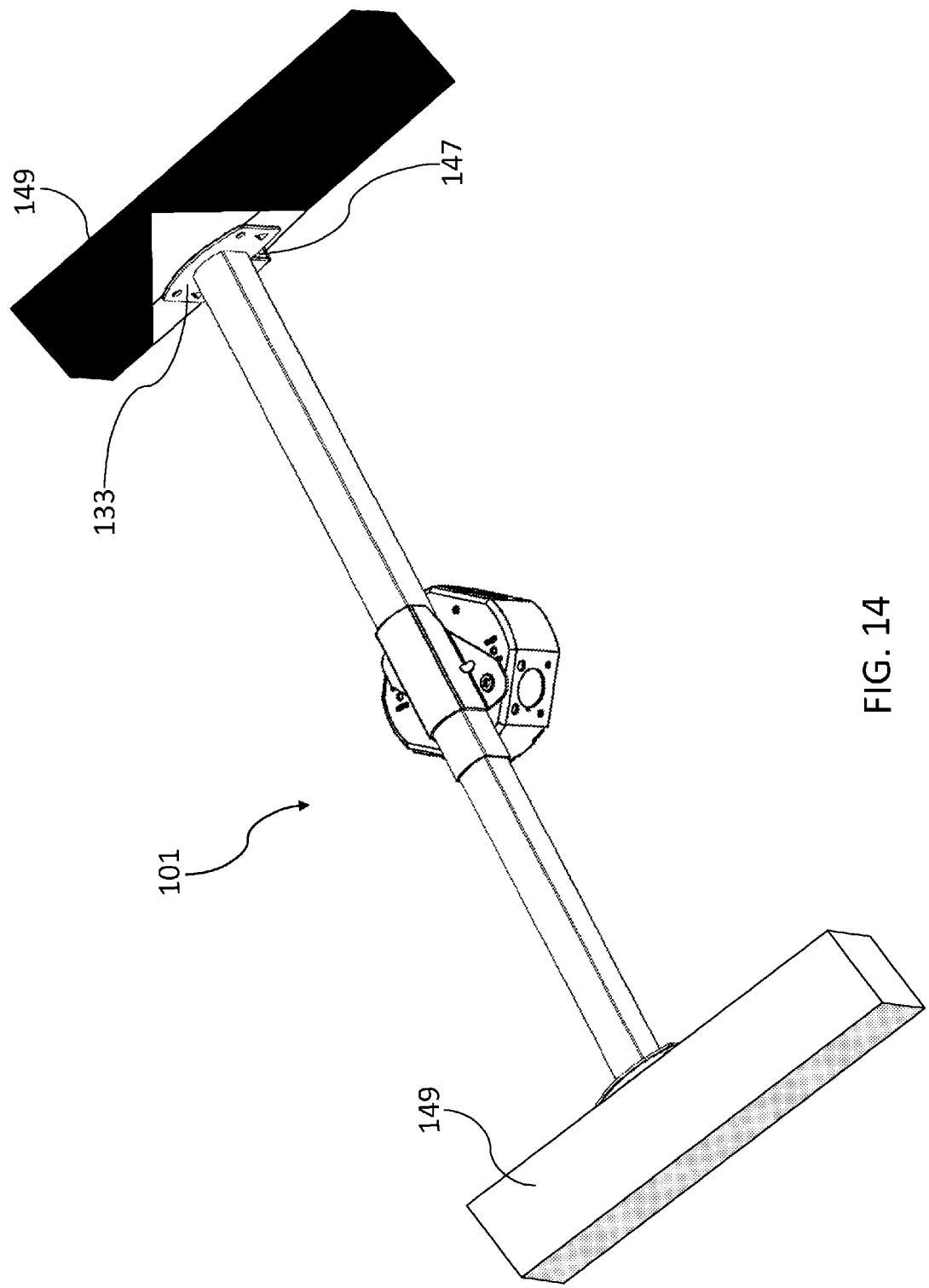
FIG. 14 is a front perspective view of a hanger bar of the present invention mounted between two ceiling joists.

FIGS. 3-6 show the end plates 133 comprised of nail prongs 143. The nail prongs 143 allow for temporary installation of the assembled hanger bar 101, as shown in FIG. 1, between ceiling joists in a ceiling. An installer can use a hammer or other tool to apply force to the end plates 133 so that the nail prongs 143 pierce through the surface of a wood ceiling joist. Once the hanger bar is held temporarily in place between ceiling joists by the nail prongs 143, an installer has his or her hands free to fully install the hanger bar with nails or screws. The apertures 145 shown in FIGS. 3 and 4 are used to receive fasteners such as nails or screws for full installation of the hanger bar onto ceiling joists. The flange 147 which protrudes from the end plate 133 as shown in FIGS. 4-6 also helps the installer when installing the hanger bar by abutting the surface of a ceiling joist 149 for easy placement of the end plate 133 on a ceiling joist 149, as shown in FIG. 14.

FIGS. 11-13 show another component of the hanger bar 101. The box support bracket 121 serves to attach a box 119, as shown in FIGS. 1 and 2, to the hanger bar 101. The box support bracket comprises a top wall 123, two side walls 125, bracket flanges 127, bracket apertures 131 and bracket flange braces 129. The top wall 123 and side walls 125 of the box support bracket 121 are sized so that they fit over the top wall 107 and side walls 111 of the tube segments 103 and 105, as shown in FIG. 1. The bracket flanges 127 protrude from the bracket side walls 125, and the bracket flanges 127 contain the bracket apertures 131 that receive a fastener such as a nail or screw to attach an electrical box 119, as shown in FIGS. 1 and 2, to the box support bracket 121. The bracket flange braces 129 serve to increase the rigidity of the bracket flanges 127 so that they are able to support the weight of the electrical box 119 and electrical device, such as a light fixture or ceiling fan, which is attached to the box 119 by an installer.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

What is claimed is:

1. A hanger bar for securing an electrical box between joists in a ceiling, the hanger bar comprising:
    a main tube section which has a plurality of tabs protruding transversely outward from distal ends of the main tube section;
    a box support bracket that allows for attachment of the electrical box and which attaches to the main tube section; and
    two end plates which attach to the distal ends of the main tube section; and wherein the two end plates comprise a plurality of slots which correspond to the plurality of tabs on the distal ends of the main tube section so that the slots align with the tabs to receive the tabs, the tabs extending through the slots, the tabs being bent transversely with respect to said main tube section so as to attach said end plates to said main tube section, allowing the end plates to be attached to the distal ends of the main tube section without the use of fasteners or welding.

2. The hanger bar of claim 1, wherein the main tube section further comprises at least two tube segments, including:
    a first tube segment having a hollow cross-section; and
    a second tube segment having a hollow cross-section, the second tube segment being received in and perimetrically overlain by the first tube segment to form the main tube section; wherein
    the two tube segments are adapted to telescopically expand and contract to span a variety of distances between ceiling joists.

3. The hanger bar of claim 1, wherein the main tube section has an arched shape spanning the cross-section to provide extra strength and resistance to bending over the length of the tube.

4. The hanger bar of claim 1, wherein the end plates further comprise a plurality of prongs which protrude away from the hanger bar to be used for piercing wood ceiling joists for temporary installation of the hanger bar and a plurality of apertures for receiving fasteners such as screws or nails so that the hanger bar can be securely mounted between ceiling joists by an installer.

5. The hanger bar of claim 1, wherein the end plates each further comprise a flange which protrudes from a bottom edge of the end plate and wherein the flange faces toward a respective ceiling joist so that the flange abuts a bottom edge of the respective ceiling joist so as to align the end plate against the edge of the respective ceiling joists.

6. The hanger bar of claim 1, wherein the box support bracket is further comprised of at least one flange which protrudes from at least one sidewall of the bracket and has at least one flange aperture for accepting fasteners such as nails or screws for attachment of the electrical box and wherein the bracket is shaped so that it fits over the hanger bar and can slide to any position along the length of the hanger bar, allowing an installer to slide the box support bracket to any position desired along the length of the hanger bar.

7. The box support bracket of claim 6, wherein the box support bracket is further comprised of flange braces that connect between the at least one flange and side wall of the box support bracket so as to add rigidity to the at least one flange to support the weight of the electrical box.

8. A hanger bar for securing an electrical box between joists in a ceiling, the hanger bar comprising:
    a main tube section which has a plurality of tabs protruding transversely outward from distal ends of the main tube section;
    a box support bracket that allows for attachment of the electrical box and which attaches to the main tube section;
    two end plates which attach to the distal ends of the main tube section; and wherein the two end plates comprise a plurality of slots which correspond to the plurality of tabs on the distal ends of the main tube section so that the slots align with the tabs to receive the tabs against the end plates, the tabs extending through the slots, wherein said tabs secure said end plates to said main tube section, allowing the end plates to be attached to the distal ends of the main tube section without the use of fasteners or welding.

9. The hanger bar of claim 8, wherein the main tube section further comprises at least two tube segments, including:

a first tube segment having a hollow cross-section; and
a second tube segment having a hollow cross-section, the second tube segment being received in and perimetrically overlain by the first tube segment to form the main tube section; wherein
the two tube segments are adapted to telescopically expand and contract to span a variety of distances between ceiling joists.

10. The hanger bar of claim 8, wherein the main tube section has an arched shape spanning the cross-section to provide extra strength and resistance to bending over the length of the tube.

11. The hanger bar of claim 8, wherein the end plates further comprise a plurality of prongs which protrude away from the hanger bar to be used for piercing wood ceiling joists for temporary installation of the hanger bar and a plurality of apertures for receiving fasteners such as screws or nails so that the hanger bar can be securely mounted between ceiling joists by an installer.

12. The hanger bar of claim 8, wherein the end plates each further comprise a flange which protrudes from a bottom edge of the end plate and wherein the flange faces toward a respective ceiling joist so that the flange abuts a bottom edge of the respective ceiling joist so as to align the end plate against the edge of the respective ceiling joist.

13. The hanger bar of claim 8, wherein the box support bracket is further comprised of at least one flange which protrudes from at least one sidewall of the bracket and has at least one flange aperture for accepting fasteners such as nails or screws for attachment of the electrical box and wherein the bracket is shaped so that it fits over the hanger bar and can slide to any position along the length of the hanger bar, allowing an installer to slide the box support bracket to any position desired along the length of the hanger bar.

14. The box support bracket of claim 13, wherein the box support bracket is further comprised of flange braces that connect between the at least one flange and side wall of the box support bracket so as to add rigidity to the at least one flange to support the weight of the electrical box.

15. A hanger bar for securing an electrical box between joists in a ceiling, the hanger bar comprising:
a main tube section which is comprised of two tube segments, including:
a first tube segment having a hollow, closed perimeter cross-section; and
a second tube segment having a hollow, closed perimeter cross-section, the second tube segment being received in and perimetrically enclosed by the first tube segment; and
which has a plurality of tabs protruding transversely outward from distal ends of the main tube section, wherein the tube segments are adapted to telescopically expand and contract to span a variety of distances;
a box support bracket that allows for attachment of the electrical box and which attaches to the main tube section; and
two end plates which attach to the distal ends of the main tube section; wherein the two end plates comprise a plurality of slots which correspond to the plurality of tabs on the distal ends of the main tube section so that the slots align with the tabs to receive the tabs against the end plates, wherein said tabs secure said end plates to said main tube section, allowing the end plates to be attached to the distal ends of the main tube section without the use of fasteners or welding.

16. The hanger bar of claim 15, wherein the two tube segments of the main tube section each have an arched shape spanning the cross-section to provide extra strength and resistance to bending over the length thereof.

17. The hanger bar of claim 15, wherein the end plates further comprise a plurality of prongs which protrude away from the hanger bar to be used for piercing wood ceiling joists for temporary installation of the hanger bar and a plurality of apertures for receiving fasteners such as screws or nails so that the hanger bar can be securely mounted between ceiling joists by an installer.

18. The hanger bar of claim 15, wherein the end plates each further comprise a flange which protrudes from a bottom edge of the end plate and wherein the flange faces toward a respective ceiling joist so that the flange abuts a bottom edge of the respective ceiling joist so a to align the end plate against the edge of the respective ceiling joist.

19. The hanger bar of claim 15, wherein the box support bracket is further comprised of at least one flange which protrudes from at least one sidewall of the bracket and has at least one flange aperture for accepting fasteners such as nails or screws for attachment of the electrical box and wherein the bracket is shaped so that it fits over the hanger bar and can slide to any position along the length of the hanger bar, allowing an installer to slide the box support bracket to any position desired along the length of the hanger bar.

20. The box support bracket of claim 19, wherein the box support bracket is further comprised of flange braces that connect between the at least one flange and side wall of the box support bracket so as to add rigidity to the at least one flange to support the weight of the electrical box.

* * * * *